US009331923B2

(12) United States Patent
Li et al.

(10) Patent No.: US 9,331,923 B2
(45) Date of Patent: May 3, 2016

(54) DS-LITE WITH BFD SUPPORT

(71) Applicant: Futurewei Technologies, Inc., Plano, TX (US)

(72) Inventors: Jian Li, Beijing (CN); Ting Zou, Cupertino, CA (US); Jing Huang, Shenzhen (CN); Min Zha, Shenzhen (CN); Xushan Lu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 411 days.

(21) Appl. No.: 13/784,404

(22) Filed: Mar. 4, 2013

(65) Prior Publication Data

US 2013/0229922 A1   Sep. 5, 2013

Related U.S. Application Data

(60) Provisional application No. 61/606,070, filed on Mar. 2, 2012.

(51) Int. Cl.
*H04L 12/26* (2006.01)
*H04L 12/24* (2006.01)

(52) U.S. Cl.
CPC ........ *H04L 43/0823* (2013.01); *H04L 41/0659* (2013.01); *H04L 41/0677* (2013.01)

(58) Field of Classification Search
CPC ............ H04L 43/0823; H04L 41/0659; H04L 41/0677; H04L 29/08072; H04Q 11/0478
See application file for complete search history.

(56) References Cited

U.S. PATENT DOCUMENTS

| | | | | |
|---|---|---|---|---|
| 8,817,816 B2* | 8/2014 | Sarikaya | ........................ | 370/466 |
| 8,942,233 B2* | 1/2015 | Perkins | ............. | H04L 29/12066 |
| | | | | 370/238 |
| 2007/0180105 A1* | 8/2007 | Filsfils | ................ | H04L 12/2602 |
| | | | | 709/224 |
| 2008/0037436 A1* | 2/2008 | Liu | ..................... | H04L 12/4633 |
| | | | | 370/250 |
| 2011/0090815 A1* | 4/2011 | Gundavelli | ......... | H04L 12/4633 |
| | | | | 370/253 |
| 2012/0173875 A1* | 7/2012 | Mahidhara | ............ | H04W 4/008 |
| | | | | 713/168 |
| 2013/0188641 A1* | 7/2013 | Lee | ......................... | H04L 69/08 |
| | | | | 370/392 |

FOREIGN PATENT DOCUMENTS

CN           102624609 A  *  8/2012

OTHER PUBLICATIONS

Wing, D. et al., "Port Control Protocol (PCP)," draft-ietf-pcp-base-23, Feb. 10, 2012, 94 pages.
Tsou, T., "BFD Support DS-Lite," draft-tsou-softwire-bfd-ds-lite-00, Mar. 5, 2012, 8 pages.
Tsou, T., "BFD Support DS-Lite," draft-tsou-softwire-bfd-ds-lite-01, Mar. 12, 2012, 8 pages.
Tsou, T., "BFD Support DS-Lite," draft-tsou-softwire-bfd-ds-lite-02, Mar. 23, 2012, 8 pages.

(Continued)

*Primary Examiner* — Jung Park
*Assistant Examiner* — Chuong M Nguyen
(74) *Attorney, Agent, or Firm* — Conley Rose, P.C.; Grant Rodolph; Brandt D. Howell

(57) ABSTRACT

A network node for detecting failures in a Dual Stack Lite (DS-Lite) tunnel, comprising a processor configured to obtain a domain name that identifies a first node, create the DS-Lite tunnel to the first node using the domain name, initiate a first bidirectional forwarding detection (BFD) session to the first node, transmit a plurality of BFD data packets within the DS-Lite tunnel, and detect a failure within the DS-Lite tunnel using the BFD data packets.

13 Claims, 6 Drawing Sheets

(56) References Cited

OTHER PUBLICATIONS

Tsou, T., et al., "DS-Lite Failure Detection and Failover," draft-tsou-softwire-bfd-ds-lite-03, Jun. 27, 2012, 9 pages.
Tsou, T., et al., "DS-Lite Failure Detection and Failover," draft-tsou-softwire-bfd-ds-lite-04, Feb. 1, 2013, 10 pages.
Vinokour. V., et al., "Configuring BFD With DHCP and Other Musings," draft-vinokour-bfd-dhcp-01, May 9, 2008, 19 pages.
Postel, J., "Internet Control Message Protocol," RFC 792, Sep. 1981, 22 pages.
Brander, S., "Key Words for Use in RFCs to Indicate Requirement Levels," RFC 2119, Mar. 1997, 4 pages.
Conta, A., et al., "Internet Control Message Protocol (ICMPv6)," RFC 4443, Mar. 2006, 25 pages.
Katz, D., et al., "Bidirectional Forwarding Detection (BFD)," RFC 5880, Jun. 2010, 50 pages.
Katz, D., et al., "Bidirectional Forwarding Detection (BFD) for IPv4 and IPv6 (Single Hop)," RFC 5881, Jun. 2010, 8 pages.
Katz, D., et al., "Generic Application of Bidirectional Forwarding Detection (BFD)," RFC 5882, Jun. 2010, 18 pages.
Katz, D., et al., "Bidirectional Forwarding Detection (BFD) for Multihop Paths," RFC 5883, Jun. 2010, 7 pages.
Durand, A., et al., "Dual-Stack Lite Broadband Deployments Following IPv4 Exhaustion," RFC 6333, Aug. 2011, 32 pages.
Hankins, D., et al., "Dynamic Host Configuration Protocol for IPv6 (DHCPv6) Option for Dual-Stack Lite," RFC 6334, Aug. 2011, 7 pages.
Frost, D., et al., "Packet Loss and Delay Measurement for MPLS Networks," RFC 6374, Sep. 2011, 52 pages.
IEEE Computer Society, "IEEE Standard for Local and Metropolitan Area Networks, Virtual Bridged Local Area Networks, Amendment 5: Connectivity Fault Management," 802.1ag, 2007, 260 pages.
Wing, D., "Port Control Protocol (PCP)," draft-ietf-pcp-base-26, Jun. 5, 2012, 100 pages.
Wing, D., "Port Control Protocol (PCP)," draft-ietf-pcp-base-29, Nov. 7, 2012, 107 pages.
"Straw Ballot," Broadband Forum, ds12006.470, WT-146 (Juniper), Subscriber Sessions, Revision 27, Jan. 2012, 50 pages.

* cited by examiner

400

| | Item | Size (bits) |
|---|---|---|
| 402 | Version | 3 |
| 404 | Diagnostic | 5 |
| 406 | State | 2 |
| 408 | Poll | 1 |
| 412 | Final | 1 |
| 414 | Control Plane Independent | 1 |
| 416 | Authentication Present | 1 |
| 418 | Demand | 1 |
| 420 | Multipoint | 1 |
| 422 | Defect Multiplier | 8 |
| 424 | Length | 8 |
| 428 | My Discriminator | 32 |
| 430 | Your Discriminator | 32 |
| 432 | Desired Min Tx Interval | 32 |
| 434 | Required Min Rx Interval | 32 |
| 436 | Required Min Echo Rx Interval | 32 |

*FIG. 4*

DS-LITE WITH BFD SUPPORT

CROSS-REFERENCE TO RELATED APPLICATIONS

The present application claims priority to U.S. Provisional Patent Application No. 61/606,070 filed Mar. 2, 2012 by Jian Li, et al. and entitled "DS-Lite with BFD Support," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In today's Internet Protocol (IP) networks, network nodes, such as routers, switches, servers, and computers may be assigned IP addresses used to locate and identify the network nodes. In recent years, IP networks have been transitioning from an IP version 4 (IPv4) address and routing system to an IP version 6 (IPv6) address and routing system. One reason for the transition is because of IPv4 address exhaustion or the depletion of unallocated IPv4 addresses plaguing the infrastructure of IP networks. IPv4's addressing structure may provide about $2^{32}$ (4,294,967,296) global addresses, which is no longer enough for the growing number of end users, hosts, and mobile devices. Deploying and ramping up IPv6 address and routing systems may resolve IPv4 address exhaustion because IPv6 may support about $3.4 \times 10^{38}$ global addresses. Unfortunately, majority of the providers for Internet services and other Internet vendors are in the initial phases of transitioning over to IPv6 address and routing systems.

As IPv4 addresses become depleted, some Internet Service Providers (ISPs) may be unable to provide globally routable IPv4 addresses to all their clients. However, clients may need to access network nodes that have IPv4 addresses and no IPv6 addresses. To provide client access to the IPv4 networks, ISPs have employed different technologies, such as Dual-Stack Lite (DS-Lite) technology as described in the Internet Engineering Task Force (IETF) Request for Comments (RFC) 6333, published August 2011, which is incorporated herein as if reproduced by its entirety, to provide IPv4 services over IPv6 networks. More specifically, the DS-Lite technology may create an IPv4-in-IPv6 tunnel from a customer premises equipment (CPE) to an Address Family Transition Router (AFTR) within the ISP network. By employing DS-Lite, ISPs may avoid the need to allocate different IPv4 addresses to clients because different clients may use the same IPv4 addresses. Therefore, DS-Lite technology may be beneficial as IP networks continually transition from IPv4 address and routing systems to IPv6 address and routing systems.

In DS-Lite technology, DS-Lite tunnels (e.g. IPv4-in-IPv6 tunnels) may be stateless and may have no status information. As a result, failure detection and failover methods may not be available for DS-Lite tunnels. Without failure detection and failover methods, managing and diagnosing failures within the IP network may create problems for network operation and maintenance. For instance, the IP network may be unable to determine whether a DS-Lite tunnel is operational (e.g. in an "up" status or a "down" status). If a link problem or other failure occurs within the DS-Lite tunnel, the CPE may be unable to automatically switch over to another AFTR to continue network services. Instead, an operator may be needed to manually reroute the DS-Lite tunnel from the CPE to the another AFTR. Hence, a solution is needed to efficiently manage and detect failures within DS-Lite tunnels.

SUMMARY

In one embodiment, the disclosure includes a network node for detecting failures in a DS-Lite tunnel, comprising a processor configured to obtain a domain name that identifies a first node, create the DS-Lite tunnel to the first node using the domain name, initiate a first bidirectional forwarding detection (BFD) session to the first node, transmit a plurality of BFD data packets within the DS-Lite tunnel, and detect a failure within the DS-Lite tunnel using the BFD data packets.

In yet another embodiment, the disclosure includes a network node to detect failures in a plurality of DS-Lite tunnels, comprising a processor configured to establish a plurality of DS-Lite tunnel with a plurality of initiation nodes, receive a first BFD data packet to create a first BFD session, and transmit a second BFD data packet to create a second BFD session, wherein the first BFD session and the second BFD session are used to detect a failure within a first DS-Lite tunnel.

In yet another embodiment, the disclosure includes a method for detecting a failure within a DS-Lite tunnel between a Basic Bridging Broadband (B4) node and an AFTR node, wherein the method comprises creating the DS-Lite tunnel to the AFTR node, transmitting a first BFD data packet to initiate a first BFD session to the AFTR node, receiving a second BFD data packet used to create a second BFD session, detecting a failure within the DS-Lite tunnel using the first BFD session and the second BFD sessions, terminating the DS-Lite tunnel when the failure occurs, and creating a new DS-Lite tunnel to a second AFTR node when the failure occurs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table describing the elements of an embodiment of the BFD data packet used to setup a BFD session.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, an apparatus, and a system that manage and detect failures for DS-Lite tunnels. A DS-Lite tunnel may be setup between an initiation node and a termination node to transmit BFD data packets. The initiation node and termination node may be the endpoints for the DS-Lite tunnel. To transmit BFD data packets, BFD sessions may be created between the initiation node and the termination node. The initiation node may initiate a first BFD session from the initiation node to the termination node, and the termination node may initiate a second BFD session from the termination node to the initiation node. After the establishing the BFD sessions, BFD data packets may be transmitted within the DS-Lite tunnel to monitor the status of the DS-Lite tunnel. When the BFD sessions detect a failure, the failure information may be sent to the management plane, and the initiation node may terminate the DS-Lite tunnel and subsequently create a new DS-Lite tunnel to a new termination node. In place of BFD, other embodiments may use Port Control Protocol (PCP) or Internet Control Message Protocol (ICMP) to manage and detect failures within DS-Lite tunnels.

Figure 1:
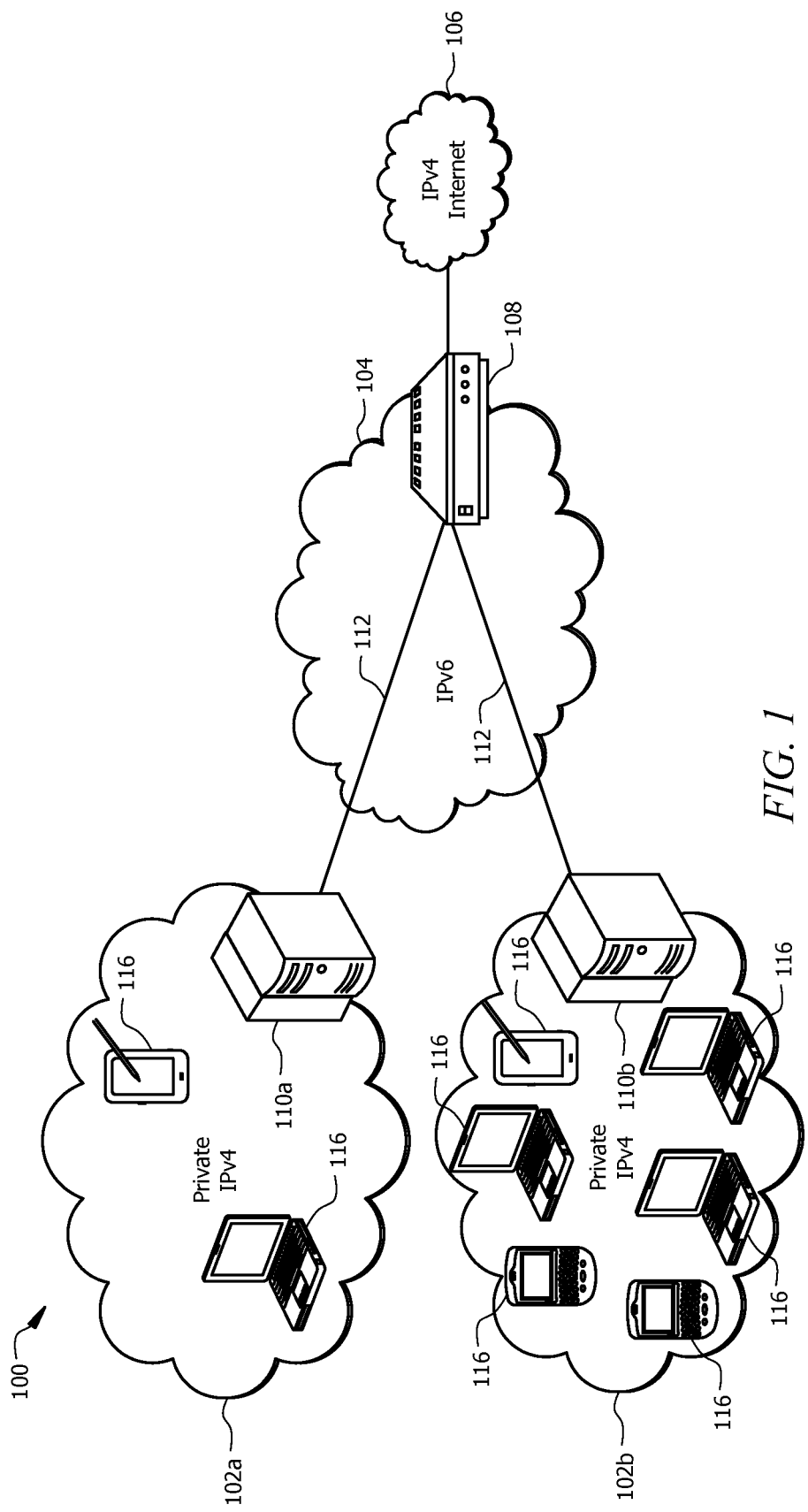
FIG. 1 is a schematic diagram of an embodiment of a network that manages and detects failures for DS-Lite tunnels.

FIG. 1 is a schematic diagram of an embodiment of a network 100 that manages and detects failures for DS-Lite tunnels. Network 100 may be a network comprising one or more local area networks (LANs), virtual networks, and/or wide area networks (WANs). Network 100 may be a network that operates in the electrical, optical, or a combination of both domains. Network 100 may offer data services that forward data from one node to another node without using pre-configured routes. Alternatively, network 100 may be configured to forward data from one network node to another network node across network 100 along pre-configured or pre-established paths. FIG. 1 illustrates that network 100 may comprise private IPv4 networks 102a and 102b, an IPv6 network 104, and an IPv4 Internet network 106. The private IPv4 networks 102a and 102b may be client networks that may not be publicly accessed (e.g. private intranet) by external users or network nodes. The IPv4 private networks 102a and 102b may be any type of network, such as an Ethernet network, that supports the IPv4 routing protocol to transport data traffic. The IPv4 private networks 102a and 102b may be networks comprising one or more local area networks (LANs) and/or virtual networks that may use private IPv4 addresses. The private IPv4 addresses may be used within the IPv4 private networks 102a and 102b, but not used outside the IPv4 private networks 102a and 102b.

In contrast to the IPv4 private networks 102a and 102b, IPv6 network 104 and IPv4 Internet network 106 may be public networks with network nodes visible to other networks. The IPv6 network 104 may be any network that supports the IPv6 routing protocol. In one embodiment, the IPv6 network 104 may be a WAN network, such as an Internet Service Provider (ISP) network. The IPv6 network 104 may comprise a plurality of network nodes that support the IPv6 routing protocol. Moreover, the IPv6 network 104 may be a public network that uses IPv6 global addresses. Similar to the IPv4 private networks 102a and 102b, IPv4 Internet network 106 may be any network that supports the IPv4 routing protocol. The IPv4 Internet network 106 may be publicly accessed and may use global IPv4 addresses. The global IPv4 addresses and the global IPv6 addresses may be addresses approved and allocated by Internet Assigned Numbers Authority (IRNA) and the Regional Internet Registry (RIR).

Each of the IPv4 private networks 102a and 102b may comprise one or more end user nodes 116 and an initiation node 110a and 110b. FIG. 1 illustrates that initiation node 110a may be located in IPv4 private network 102a, while initiation node 110b may be located in IPv4 private network 102b. The initiation nodes 110a and 110b may be a home gateway, CPE or any other network node that comprises a DS-Lite B4 element. In one embodiment, initiation nodes 110a and 110b may be B4 nodes. The initiation nodes 110a and 110b may be Open Systems Interconnection (OSI) network layer 3 devices that may be configured to perform dual stacking as defined in the IETF RFC 4213, published October 2005, which is incorporated herein as if reproduced by its entirety. For example, the initiation node 110a may perform dual stacking by encapsulating IPv4 data packets in an IPv6 header and transmitting the newly encapsulated IPv6 data packets via a DS-Lite tunnel 112 to termination node 108. The initiation nodes 110a and 110b may also be configured to distribute private IPv4 addresses for the end user nodes 116 within the private IPv4 networks 102a and 102b. As shown in FIG. 1, initiation nodes 110a and 110b may act as an interface between the private IPv4 networks 102a and 102b and the IPv6 network 104. The end user nodes 116 may encompass a variety of devices, such as personal computers, telephones, cellular phones, video imaging/conferencing equipment, IP devices, and/or video-audio devices (e.g. televisions). The end user nodes 116 may be any device that may transmit data into and/or receive data from the IPv4 private networks 102a and 102b.

The IPv6 network 104 may comprise a termination node 108 that may be coupled to the initiation nodes 110a and 110b. Other network nodes that are not illustrated in FIG. 1 may be coupled between the terminal nodes 108 and initiation nodes 110a and 110b. In another embodiment, the termination node 108 may be directly connected, without intervening network nodes, to the initiation nodes 110a and 110b. DS-Lite tunnels 112 initiated by the initiation nodes 110a and 110b may designate termination node 108 as the endpoint of the DS-Lite tunnels 112. The termination node 108 may act as an interface between the IPv6 network 104 and the IPv4 Internet network 106. As such, termination node 108 may be configured to route data packets transported via the DS-Lite tunnels 112 to the IPv4 Internet 106 using network address translation (NAT) functions. For example, after receiving data packets transported via DS-Lite tunnels 112, termination node 108 may decapsulate the IPv6 headers from the data packets and may provide IPv4-to-IPv4 address translation for the data packets. In one embodiment, the termination node 108 may provide NAT functions as an AFTR node that is assigned an IPv6 address and an IPv4 address.

As shown in FIG. 1, two DS-Lite tunnels 112 may be used to transport data packets between the initiation nodes 110a and 110b to the termination node 108. In one embodiment, a B4 node may be used to create a DS-Lite tunnel 112 that ends at an AFTR node. The DS-Lite tunnels 112 may be bidirectional such that the DS-Lite tunnels 112 may transport data packets transmitted from the initiation nodes 110a and 110b to the termination node 108 and data packets transmitted from the termination node 108 to initiation nodes 110a or 110b. In one embodiment, DS-Lite tunnels 112 may be an IPv4-in-IPv6 tunnel that transmits IPv4 data packets encapsulated with an IPv6 header. Other embodiments of the DS-Lite tunnels 112 may be configured to transport packets with different types of encapsulations. The DS-Lite tunnels 112 may be virtual links between the initiation nodes 110a and 110b and termination node 108. BFD data packets may be transmitted through DS-Lite tunnels to manage and detect failures within the DS-Lite tunnel. In one embodiment of network 100 may have more than two initiation nodes 110 with each initiation node 110 creating a DS-Lite tunnel 112 to the same termination node 108. In another embodiment, the initiation nodes 110 may create DS-Lite tunnels 112 to different termination nodes 108.

BFD sessions may be established between the initiation nodes 110a and 110b and the termination node 108. For example, a BFD session may have one endpoint located at initiation node 110a and another endpoint located at termination node 108. In one embodiment, the IPv4 address of a B4 node and a AFTR node may be the endpoints for a BFD session. The BFD sessions may detect faults in a bidirectional path as described in the IETF RFC 5880, published June 2010, which is incorporated herein as if reproduced by its entirety. A BFD session may operate in one of two modes, an Asynchronous mode and a Demand mode. When the initiation nodes 110a and 110b and/or termination node 108 operate in the Asynchronous mode, BFD data packets may be sent periodically between the initiation nodes 110a and 110b and the termination node 108. If the initiation nodes 110a and 110b and/or termination node 108 do not receive a certain number of the BFD data packets, the BFD session may be considered down and a fault has occurred. When the initiation nodes 110a and 110b and/or termination node 108 operate in the Demand node, BFD data packets may not be sent periodically, unless a Poll sequence is initiated as described in IETF RFC 5880. Regardless of which mode is in use, the initiation nodes 110a and 110b and/or termination node 108 may also initiate an Echo function. When the Echo function is active, a plurality of Echo packets are sent. If a sufficient number of Echo packets do not arrive at the receiving endpoint, the BFD may be considered down and a fault has occurred within the DS-Lite tunnel. BFD may also be used in conjunction with applications like Open Shortest Path First (OSPF), Intermediate System to Intermediate System (IS-IS), and other routing protocols for fault recovery and re-route as described in IETF RFC 5882, published June 2010, which is incorporated herein as if reproduced by its entirety.

The creation of BFD sessions between the initiation nodes 110a and 110b and the termination node 108 may be used to provide status information for DS-Lite tunnels 112. If a fault is detected, each of the initiation nodes 110a and 110b may terminate the DS-Lite tunnels 112 with termination node 108 and create new DS-Lite tunnels 112 with another termination node 108 that is not shown in FIG. 1. Some of the BFD parameters (e.g. peer IP addresses) may be available when using DS-Lite tunnels 112, and thus additional Dynamic Host Configuration Protocol (DHCP) options may not be needed to distribute the BFD parameters to the initiation nodes 110a and 110b (e.g. B4 elements). Moreover, in the DS-Lite context, additional BFD parameters may be negotiated by BFD signaling and/or statically configured to prevent defining extra DHCP options.

In one embodiment, instead of using BFD, network 100 may be configured to implement Port Control Protocol (PCP) as defined in the IETF publication draft-ietf-pcp-base-29, published Nov. 7, 2012, which is incorporated herein as if reproduced by its entirety. PCP may be used for testing network connectivity when PCP is supported within network 100. PCP may create a mapping so that external end users, such as client networks and/or external network nodes, may visit network nodes (e.g. servers) located within the IPv4 Internet network 106. The lifetime of the mapping for external end users may have a time period in hours and the lifetime may be refreshed periodically by external end users before the mapping expires. For the purpose of network connectivity tests, an initiation node 110a may create a mapping in the termination node 108 via PCP that has a shorter lifetime (e.g. about 10 seconds) and may continually refresh the mapping before it expires. If any refresh request fails, the initiation node 110a may determine that a failure has occurred in a link, the termination node 108, and/or network nodes located within the IPv4 Internet network 106. In one embodiment, the encapsulation mode for PCP may be used to send PCP packets through the DS-Lite tunnel when detecting the network connectivity of the DS-Lite tunnel. Besides failures of the link and the routing, PCP may cover failures for certain NAT functions performed by the termination node 108. PCP may be a control protocol implemented in hardware, software, or both.

In another embodiment, ICMP Echo request and Echo response messages as described in IETF RFC 4443, published March 2006, which is incorporated herein as if reproduced by its entirety, may be used to determine whether network nodes within network 100 are reachable. In DS-Lite, the initiation node 110a may send Echo request packets to the termination node 108 periodically. If the initiation node 110a does not receive a certain number (e.g., three) of Echo response packets in a certain timeout period from the termination node 108, then the initiation node 110a may determine that a fault has occurred in the DS-Lite tunnel. In one embodiment, the Echo request packets may be ICMPv4 packets and not ICMPv6 packets, and the termination node 108 may process ICMP message via software.

Figure 2A:
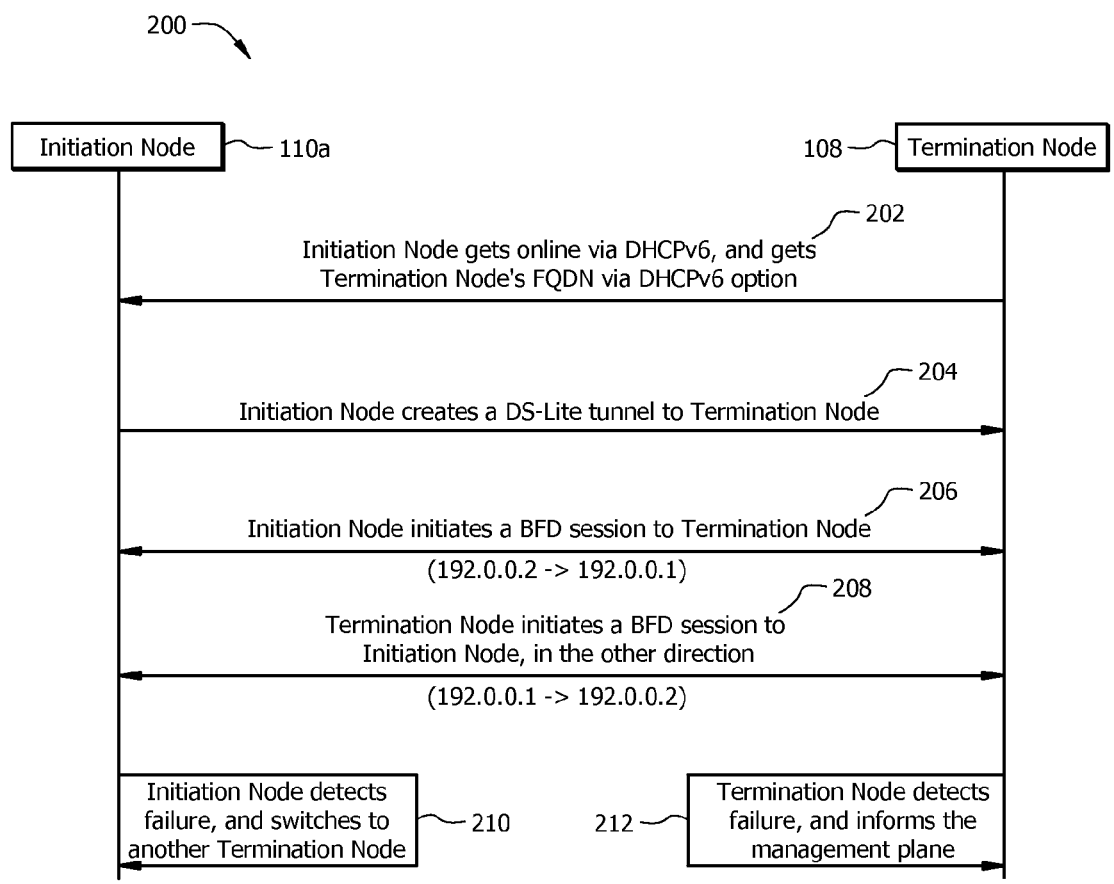
FIG. 2A is a protocol diagram of an embodiment of a message exchange process for creating BFD sessions.

FIG. 2A is a protocol diagram of an embodiment of a message exchange process 200 for creating BFD sessions. When creating BFD sessions, the initiation node 110a may be assigned an IPv4 address of 192.0.0.2, and the termination node 108 may be assigned an IPv4 address of 192.0.0.1. As a result, each initiation node 110a may be assigned the same IP address (e.g. 192.0.02) as another initiation node 110a, and each termination node 108 may be assigned the same IP address (e.g. 192.0.0.1) as another termination node 108. Thus, IPv4 addresses may not be sufficient for setting up a BFD session. From an initiation node's 110a point of view, the initiation node 110a may create a DS-Lite tunnel to a termination node 108 to establish network connectivity to the termination node 108, and send IPv4 BFD data packets through the DS-Lite tunnel. From the termination node's 108 perspective, a plurality of initiation nodes 110a and 110b with the same IPv4 address may setup BFD sessions with the termination node 108. To distinguish the initiation nodes 110a, the termination node 108 may account for the IPv4 address and the IPv6 address of the initiation nodes 110a when establishing BFD sessions.

FIG. 2A illustrates that messages 202-212 may be exchanged between the initiation node 110a and the termination node 108. Each of the messages 202-212 may represent one or more data packets exchanged between the initiation node 110a and termination node 108. When initiation node 110a comes online via DHCP version 6 (DHCPv6), the initiation node 110a may not recognize whether the network attached offers DS-Lite services and the location of the termination node 108. Using FIG. 1 as an example, after initiation node 110a is online, the initiation node 110a may not know whether the IPv6 network 104 supports DS-Lite and the location of termination node 108. Prior to creating a DS-Lite tunnel, the initiation node 110a receives message 202 from the termination node 108. Message 202 may provide information the IPv6 prefix and/or an IPv6 address for the termination node 108. Moreover, message 202 may provide the Fully Qualified Domain Name (FQDN) of the termination node 108 to the initiation node 110a. The IPv6 prefix, IPv6 address, and FQDN may be obtained via DHCPv6 as described in IETF RFC 6334, published August 2011, which is incorporated herein as if reproduced by its entirety. The FQDN may be a domain name that specifies the location of the termination node 108.

After configuring the initiation node 110a, the initiation node 110a may create a DS-Lite tunnel to the termination node 108 using message 204. To form the DS-Lite tunnel, the initiation node 110a may encapsulate an IPv4 packet with an IPv6 header to form message 204 and subsequently transmit message 204 to the termination node 108. In one embodiment, after the encapsulation of the IPv4 packet, message 204 may be fragmented and may be sent as a plurality of fragmented messages. The termination node 108 may receive the encapsulated message 204 via the DS-Lite tunnel and reassemble the encapsulated message 204 if initiation node 110a fragmented message 204. After reassembly, the termination node 108 may decapsulate the IPv6 header and may process the underlying IPv4 packet. The packet IPv4 may be forwarded to an IPv4 network after performing an IPv4 to IPv4 NAT. The creation of the DS-Lite tunnel may be used to obtain network connectivity between the initiation node 110a and the termination node 108 by transporting IPv4 BFD data packets via the DS-Lite tunnel.

Once the initiation node 110a creates a DS-Lite tunnel to the termination node 108, the initiation node 110a may create a BFD session from the initiation node 110a to the termination node 108 using message 206. In one embodiment, the initiation node 110a may be designated with a global IPv4 address, such as 192.0.0.2, and the termination node 108 may be designate a different global IPv4 address, such as 192.0.0.1. Initiation node 110a may share the global IPv4 address (e.g. 192.0.0.2) with other initiation nodes 110. For example, in FIG. 1, initiation node 110a and 110b may be assigned the same global IPv4 address of 192.02.2.

Message 206 may be a plurality of BFD data packets exchanged between the initiation node 110a and the termination node 108 via the DS-Lite tunnel. The BFD data packets may be BFD control packets that may be transmitted as User Datagram Protocol (UDP) packets with destination port 3784 and/or BFD echo packets that may be transmitted in UDP packets with destination port 3785. The BFD session may be used to transmit BFD data packets from the initiation node 110a to the termination node 108. After the initiation node 110a creates a BFD session to the termination node 108, the termination node 108 may initiate another BFD session using message 208. The second BFD session may transmit BFD data packets from the termination node 108 to the initiation node 110a. Creating the BFD session will be discussed in more detail in FIG. 3.

Once the initiation node 110a and termination node 108 create the BFD sessions, the BFD sessions may manage and detect failures that occur within the DS-Lite tunnel. Message 210 may be generated by the initiation node 110a when the initiation node 110a detects a fault within the DS-Lite tunnel. When a failure occurs, the initiation node 110a may terminate the current DS-Lite tunnel created by message 204, and create a new DS-Lite tunnel with another termination node 108. Recall that the FQDN of the termination node 108 may be sent to the initiation node 110a via a DHCPv6 option. A Domain Name System (DNS) resolver may associate multiple IP addresses within a DNS server for the FQDN of the termination node 108. The initiation node 110a may choose another termination node 108 based on the list of multiple IP addresses associated with the FQDN via DHCPv6 option.

Message 212 may also be generated by the termination node 212 when a failure occurs within the DS-Lite tunnel. The failure information may be provided to a management entity via the management plane. In one embodiment, the management entity may be a network node located within the same network as the termination node 108.

Implementation of BFD session may avoid Internet Control Message Protocol (ICMP) error message problems caused by transmitting anycast frames and performing load balancing. Anycast routing may occur when a single network node transmits a data packet to a destination node that shares the same destination address with the other destination nodes. ICMP error message problems may occur when a data packet is sent from the termination node 108 to the initiation node 110a via the DS-Lite tunnel. If an intermediate network node (e.g. router) along the DS-Lite tunnel generates an ICMP error message (e.g., Packet Too Big (PTB)), then the intermediate network node may not know which termination node 108 to send the ICMP error message when performing anycast routing. In anycast routing, more than one termination node 108 may share the same destination address. When the intermediate network node performs load balancing, the ICMP error message may be sent back to the wrong termination node 108. However, BFD may avoid the ICMP error message problem because the initiation node 110a creates a new DS-Lite tunnel to a new termination node 212 and may not rely on the intermediate node to generate the fault notification.

In one embodiment, BFD sessions may be configured to support the implementation of a small time scale (e.g. milliseconds) to quickly detect faults. A time scale larger than milliseconds (e.g. about 10-30 seconds) may be used to detect faults in the milliseconds may be used in a network that support DS-Lite tunnels. Increasing the time scale may reduce the processing load for the termination node 108. A termination node 108 may be configured to support a plurality of initiation nodes 110 (e.g. tens of thousands of initiation nodes 110), which means a termination node 108 may support the same number of BFD sessions. The number of BFD sessions may affect the performance of the termination node 108, and thus longer time scales that are about 10-30 seconds may be used as the time interval for transmitting and receiving BFD data packets between termination node 108 and initiation nodes 110. For example, a termination node 108 may support about 10,000-30,000 initiation nodes 110 (e.g. subscribers). If every initiation node 110 transmit a BFD data packet every 30 seconds, the termination node 108 may encounter a load of 1-3 probe packets per millisecond and a failure detection delay in minutes. Shorter detection times may increase the load of the termination node 108.

Figure 2B:
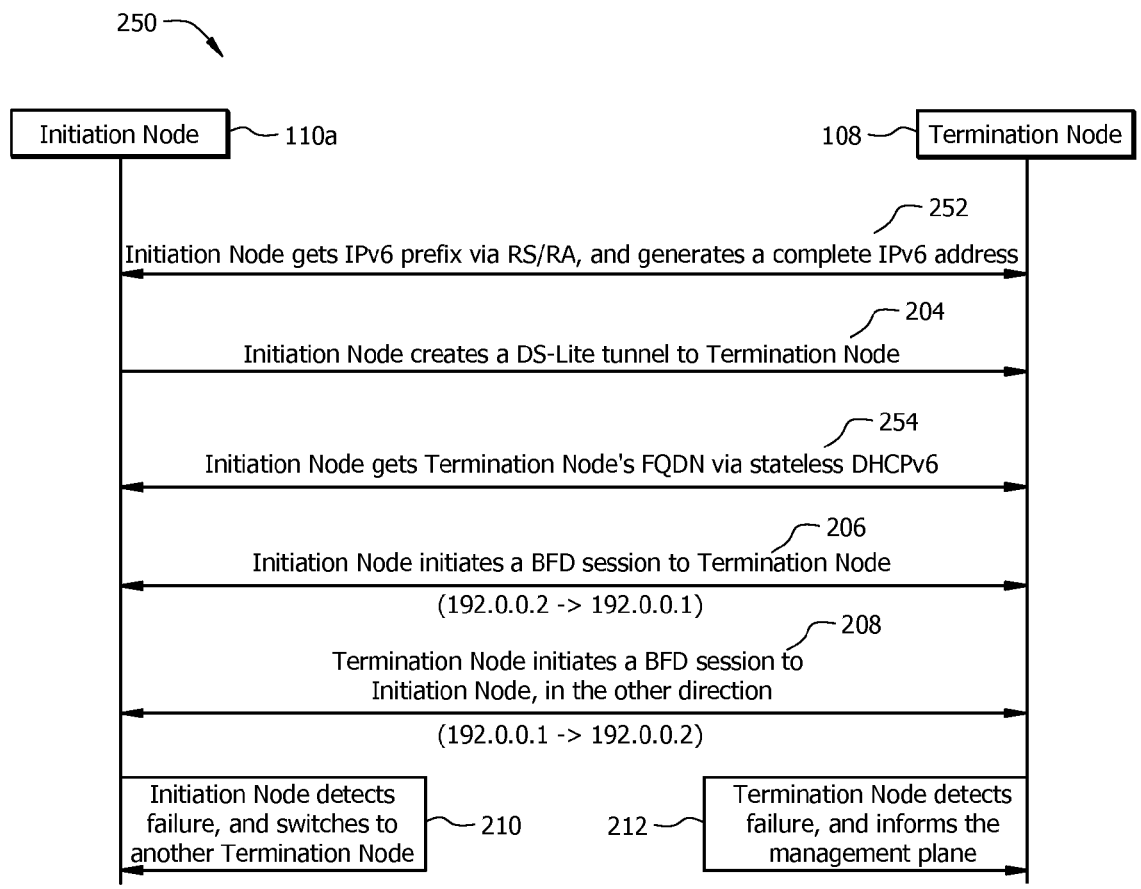
FIG. 2B is a protocol diagram of another embodiment of a message exchange process for creating BFD session.

FIG. 2B is a protocol diagram of another embodiment of a message exchange process 250 for creating BFD sessions. Instead of using DHCPv6 to obtain the IPv6 prefix and/or IPv6 address, message exchange process 250 may use router solicitation (RS) messages and/or router advertisement (RA) messages to obtain the IPv6 prefix from the termination node 108. Recall that termination node 108 may be assigned an IPv6 address to distinguish itself from other termination nodes 108. FIG. 2B illustrates that initiation node 110a may obtain the IPv6 prefix from the termination node 108 via message 252. Message 252 may be a plurality of IPv6 neighbor discovery protocol (NDP) messages, such as RS messages and/or RA messages. In one embodiment, the initiation node 110a may transmit a RS message to the termination node 108 and/or some other network node located within the same network as the termination node 108. The RS message may represent a request by the initiation node 110a to obtain the IPv6 prefix. When the termination node 108 receives the RS message, the termination node 108 may reply with a RA message that identifies the IPv6 prefix. Afterwards, the initiation node 110a may obtain the IPv6 prefix from the RA message and may generate a complete IPv6 address. Messages 204, 206, 208, 210, and 212 have been discussed above. Message 254 may be substantially similar to message 202 of FIG. 2A. Message 254 may be used to get the FQDN of the termination node 108.

Figure 3:
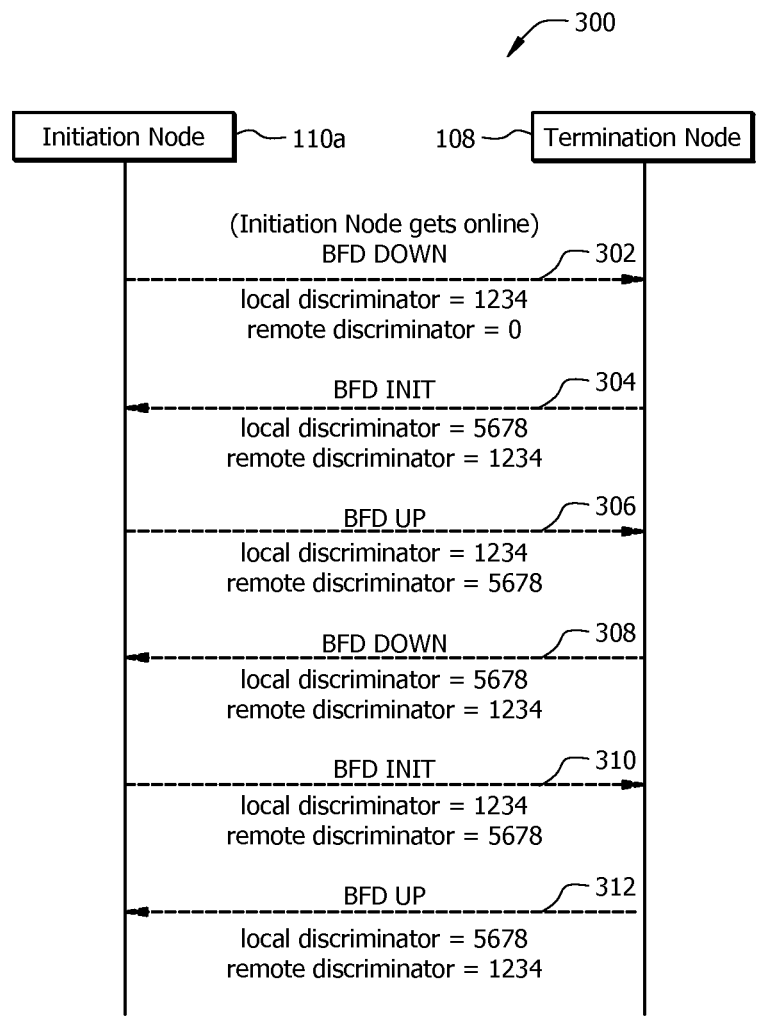
FIG. 3 is a protocol diagram of another embodiment of a message exchange process 300 for establishing a BFD session.

FIG. 3 is a protocol diagram of another embodiment of a message exchange process 300 for establishing a BFD session. The message exchange process 300 is a more detail illustration of message 206 and message 208 shown in FIGS. 2A and 2B. Messages 302-312 may be BFD data packets. After establishing a DS-Lite tunnel, the initiation node 110a may generate a local discriminator, and set the remote discriminator to zero. The local discriminator may be a unique nonzero discriminator value that identifies the transmitting network node, which is the initiation node 110a. FIG. 3 illustrates that the local discriminator value may be "1234," but other embodiments may use different local discriminator values for the initiation node 110a. The remote discriminator may identify the receiving network node. In FIG. 3, the remote discriminator may be set to zero because the initiation node 110a is creating a new BFD session. The initiation node 110a may transmit message 302 that comprises the local discriminator and the remote discriminator with values of "1234" and "0," respectively. As shown in FIG. 3, the BFD session may be in a "down" state when transmitting message 302. Other embodiments of the message exchange process 300 may be used to negotiation other BFD parameters besides the remote discriminator and the local discriminator.

When the termination node 108 receives message 302 from the initiation node 110a, the termination node 108 may generate a corresponding local discriminator that identifies the termination node 108. Furthermore, the termination node 108 may obtain the IPv6 address and the discriminator of the initiation node 110a. FIG. 3 illustrates that the local discriminator value may be "5678," but other embodiments may use different local discriminator values for the termination node 108. The termination node 108 may send a message 304 in response to message 302. Similar to message 302, message 304 may comprise a local discriminator and a remote discriminator. As shown in FIG. 3, message 304 may have a local discriminator value of "5678" that corresponds to the termination node 108 and a remote discriminator value of "1234" that corresponds to the initiation node 110a. At this point, the BFD session may be in an "initialized" state with the discriminator negotiation completed for a BFD session between the initiation node 110a and termination node 108. After receiving message 304, the initiation node 110a may transmit message 306 with a local discriminator value of "1234" and a remote discriminator value of "5678." At this point, the BFD session may be in an "up" state. Negotiation of the discriminator values may be implemented without any manual configuration.

After the BFD session is in the "up" state for the initiation node 110a to termination node 108 direction, the termination node 108 may initiate a BFD session in the opposite direction (e.g. from the termination node 108 to the initiation node 110a). To establish a BFD session in the opposite directions, discriminator negotiations may be conducted similar to as described above. The termination node 108 may use the IPv6 address and discriminator of the initiation node 110a to send message 308. Message 308 may be substantially similar to message 302 except that the local discriminator value is "5678" and the remote discriminator value is "1234" for message 308. Similar to the transmission of message 302, the BFD session in the opposition direction may be in a "down" state when transmitting message 308. Initiation node 110a may receive message 308 and transmit message 310 that may be substantially similar to message 304 except that message 310 may comprises a local discriminator value of "1234" and a remote discriminator value of "5678." The transmission of message 310 may represent the "initialized" state of the BFD session. After the termination node 108 receives message 310, the termination node 108 may transmit message 312 that indicates the BFD session in the opposite direction is in the "up" state. Cryptographic authentication may be used with BFD as described in IETF RFC 5880 to prevent potential spoofing problems.

FIG. 4 is a table describing the elements of an embodiment of the BFD data packet used to setup a BFD session. As discussed above, when creating BFD session, BFD parameters may be negotiated between the initiation node and the termination node. Using FIG. 3 as an example, messages 302-312 may be BFD data packets that pass the local discriminator and remote discriminator parameters between the initiation node and the termination node. Using the BFD data packets, the initiation node 110a and the termination node 108 may negotiate the values of the local discriminator and remote discriminator. Other BFD parameters may be negotiated, such as Peer IP address, My Discriminator, Your Discriminator, Desired minimum (Min) transmission (TX) interval, Required Min receiving (RX) interval, and Required Min Echo RX interval. In one embodiment, the BFD data packets may be an IPv4 data packet encapsulated with an IPv6 header. As discussed above, BFD may have two operating modes (e.g. asynchronous mode and demand mode) that may be selected, as well as an additional function (e.g. echo function) that can be used in combination with the two modes, as described in IETF RFC 5880, to transmit BFD data packets.

The BFD data packets may comprise the following fields: Version 402, Diagnostic 404, State 406, Poll 408, Final 412, Control Plane Independent 414, Authentication Present 416, Demand 418, Multipoint 420, Detect Multiplier 422, and Length 424. Version 402 may be about three bits long and represent the version number of the protocol. Diagnostic 404 may be about five bits long and represent a diagnostic code that specifies the local networks reason for the last state change. State 406 may be about two bits long and may represent the current BFD session state. Poll 408 may be about one bit long and may indicate whether the transmitting network is requesting verification of connectivity during a polling sequence or parameter change. Final 412 may be about one bit long and may indicate the BFD data packet is sent in response to a BFD data packet that had poll 408 set with a value of one. Control Plane Independent 414 may be about one bit long and may indicate whether the transmitting networks BFD implementation shares fate with its control plane. Authentication Present 416 may be about one bit long and may indicate that session is to be authenticated. Demand 418 may be about one bit long and may represent whether the transmitting network wishes to operate in Demand mode, which may require the receiving network to discontinue periodically transmitting BFD data packets. Multipoint 420 may be about eight bits long and may be reserved for future point-to-multipoint extensions to BFD. Detect Multiplier 422 may be about eight bits long may represent a detection time multiplier that may be multiplied by a negotiated time interval to provide detection time for the receiving network in Asynchronous mode. Length 424 may be about eight bits long and may indicate the length of the BFD data packet in bytes.

As discussed above, negotiable BFD parameters may also be passed in a BFD data packet 400. The BFD data packet 400 may further comprise the following fields to negotiate BFD parameters: My Discriminator 428, Your Discriminator 430, Desired Min TX Interval 432, Required Min RX Interval 434, and Required Min Echo RX Interval 436. My Discriminator 428 may be about 32 bits long and may represent a unique, nonzero discriminator value generated by the transmitting network. My Discriminator 428 may be used to demultiplex multiple BFD sessions between the same pair of networks. My Discriminator 428 may also be referenced in this disclosure as the local discriminator. Your Discriminator 430 may be about 32 bits long and represent a discriminator received from a corresponding remote network. Your Discriminator 430 may reflect back the received value of My Discriminator, or may be zero if that value is unknown. Your Discriminator 430 may be referenced in this disclosure as the remote discriminator. Desired Min TX Interval 432 may be about 32 bits long and may represent the minimum time interval that a network would like to use when transmitting BFD data packets, less any jitter applied. Desired Min TX Interval 432 may be represented in microseconds, with the value of zero representing a reserved value. Required Min RX Interval 434 may be about 32 bits long and may be the minimum time interval between received BFD data packets that the network is capable of supporting, less any jitter applied by the sender. Required Min RX Interval 434 may be represented in microseconds, and may be set to zero if the transmitting network does not want a remote network to send periodic BFD data packets. Required Min Echo RX Interval 436 may be about 32 bits and may indicate the minimum interval between received BFD Echo packets that the network is capable of supporting, less any jitter applied by the sender. Required Min Echo RX Interval 436 may be represented in microseconds. Required Min Echo RX Interval may be set to zero if the transmitting network does not support the receipt of BFD Echo packets. The time interval values m for Desired Min TX Interval 432, Required Min RX Interval 434, Required Min Echo RX Interval 436 may be set by an operator and/or a system administrator.

Figure 5:
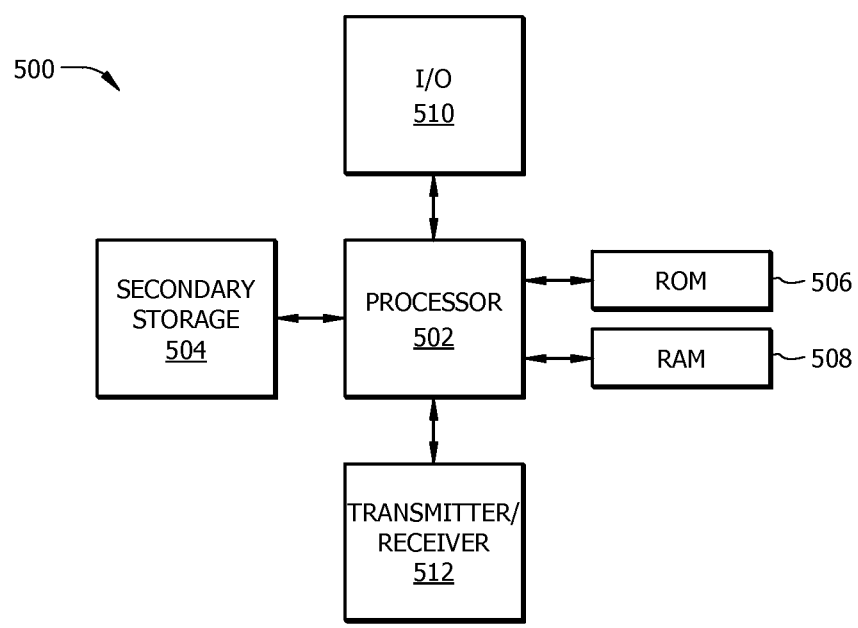
FIG. 5 is a schematic diagram of one embodiment of a general-purpose computer system suitable for implementing the several embodiments of the disclosure.

The schemes described above may be implemented on any general-purpose computer system, such as a computer or network component with sufficient processing power, memory resources, and network throughput capability to handle the necessary workload placed upon it. FIG. 5 illustrates a schematic diagram of a general-purpose computer system 500 suitable for implementing one or more embodiments of the methods disclosed herein, such as the initiation nodes 110a and 110b, the termination node 108, B4 node, and AFTR node. The computer system 500 includes a processor 502 (which may be referred to as a central processor unit or CPU) that is in communication with memory devices including secondary storage 504, read only memory (ROM) 506, random access memory (RAM) 508, transmitter/receiver 512, and input/output (I/O) device 510. Although illustrated as a single processor, the processor 502 is not so limited and may comprise multiple processors. The processor 502 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 502 may be configured to implement any of the schemes described herein, such as creating DS-Lite tunnels, initiating BFD sessions, detecting failures within DS-Lite tunnels, and terminating DS-Lite tunnels.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504. The secondary storage 504, ROM 506, and/or RAM 508 may be non-transitory computer readable mediums and may not include transitory, propagating signals. Any one of the secondary storage 504, ROM 506, or RAM 508 may be referred to as a memory, or these modules may be collectively referred to as a memory. Any of the secondary storage 504, ROM 506, or RAM 508 may be used to store forwarding information, mapping information, capability information, and priority information as described herein. The processor 502 may generate discriminator values and other BFD parameters in memory and/or retrieve the discriminator values and other BFD parameters from memory.

The transmitter/receiver 512 may serve as an output and/or input device of the initiation nodes 110a and 110b, the termination node 108, B4 node, and AFTR node. For example, if the transmitter/receiver 512 is acting as a transmitter, it may transmit data out of the computer system 500. If the transmitter/receiver 512 is acting as a receiver, it may receive data into the computer system 500. The transmitter/receiver 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 512 may enable the processor 502 to communicate with an Internet or one or more intranets. I/O devices 510 may include a video monitor, liquid crystal display (LCD), touch screen display, or other type of video display for displaying video, and may also include a video recording device for capturing video. I/O devices 510 may also include one or more keyboards, mice, or track balls, or other well-known input devices.

It is understood that by programming and/or loading executable instructions onto the computer system 500, at least one of the processor 502, the RAM 508, and the ROM 506 are changed, transforming the computer system 500 in part into a particular machine or apparatus, e.g., a termination node, having the novel functionality taught by the present disclosure. It is fundamental to the electrical engineering and software engineering arts that functionality can be implemented by loading executable software into a computer, which can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, subsystems, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network node for detecting failures in a Dual Stack Lite (DS-Lite) tunnel, comprising:
    a receiver configured to obtain a Fully Qualified Domain Name (FQDN) that identifies a first Address Family Transition Router (AFTR) node;
    a transmitter configured to:
        create a first DS-Lite tunnel to the first AFTR node by employing the FQDN;
        initiate a first bidirectional forwarding detection (BFD) session to the first AFTR node; and
        transmit a plurality of BFD data packets within the first DS-Lite tunnel; and
    a processor coupled to the receiver and transmitter and configured to:
        act as a Bridging Broadband (B4) node;
        detect a failure within the first DS-Lite tunnel by employing the BFD data packets;
        employ the FQDN identifying the first AFTR node to determine an internet protocol (IP) address of a second AFTR node; and
        create, via the transmitter and receiver, a second DS-Lite tunnel to the second AFTR node when failure is detected within the first DS-Lite tunnel by employing the IP address of the second AFTR node determined based on the FQDN identifying the first AFTR node.

2. The network node of claim 1, wherein the first DS-Lite tunnel transports a plurality of Internet Protocol (IP) version four (IPv4) packets that have been encapsulated with an IP version six (IPv6) header.

3. The network node of claim 1, wherein the transmitter is further configured to transmit a first BFD data packet to establish the first BFD session.

4. The network node of claim 3, wherein the first BFD data packet comprises a my discriminator field that identifies the network node and a your discriminator field that identifies the first AFTR node.

5. The network node of claim 4, wherein the your discriminator field is set to a value of zero, and wherein a Dynamic Host Configuration Protocol (DHCP) option is not used to create the first BFD session.

6. The network node of claim 1, wherein the BFD data packets are employed to negotiate a BFD parameter with the first AFTR node.

7. The network node of claim 1, wherein the processor is further configured to obtain, via the transmitter and receiver, an IP version six (IPv6) address that identifies the first AFTR node.

8. The network node of claim 1, wherein the receiver is further configured to receive a second BFD data packet from the first AFTR node, and wherein the second BFD data packet is employed to create a second BFD session.

9. The network node of claim 1, wherein the network node is assigned an IP version four (IPv4) address and the first AFTR node is assigned an IPv4 address, and wherein the IPv4 address of the network node and the IPv4 address of the first AFTR node indicate endpoints of the first BFD session.

10. A method for detecting a failure within a Dual Stack Lite (DS-Lite) tunnel between a Basic Bridging Broadband (B4) node and an Address Family Transition Router (AFTR) node, wherein the method comprises:
creating the DS-Lite tunnel to the AFTR node;
generating a unique local discriminator that identifies the B4 node;
transmitting a first BFD data packet to initiate a first bidirectional forwarding detection (BFD) session to the AFTR node, wherein the first BFD data packet comprises the unique local discriminator;
receiving a second BFD data packet used to create a second BFD session;
detecting a failure within the DS-Lite tunnel using the first BFD session and the second BFD session;
terminating the DS-Lite tunnel when the failure occurs; and
creating a new DS-Lite tunnel to a second AFTR node when the failure occurs, wherein an Internet Protocol (IP) address that identifies the second AFTR node is associated with a Fully Qualified Domain Name (FQDN) that identifies the AFTR node.

11. The method of claim 10, wherein the first BFD data packet is sent as a User Datagram Protocol (UDP) packet, wherein the first BFD data packet and the second BFD data packet are transported via the DS-Lite tunnel, and wherein the first BFD data packet and the second BFD data packet are sent using cryptographic authentication.

12. The method of claim 10 further comprising transmitting a plurality of BFD data packets to detect a failure within the DS-Lite tunnel, wherein a time period between the transmission of BFD data packets are set by a system administrator, and wherein the time period is set for a period of 10 seconds.

13. The method of claim 10 further comprising obtaining an Internet Protocol version 6 (IPv6) address, wherein the first BFD data packet provides the IPv6 address to the AFTR node, and wherein the second BFD session is initiated using the IPv6 address.

* * * * *